United States Patent

[11] 3,592,228

[72] Inventors Tetsuo Kukuminato;
    Akira Ohashi, both of 684 Chigusashinden, Osawa-machi, Kimitsu-gun, Chiba-ken, Japan
[21] Appl. No. 847,874
[22] Filed Aug. 6, 1969
[45] Patented July 13, 1971
[32] Priority Aug. 8, 1968
[33] Japan
[31] 43-55823

[54] MAGNET VALVE
7 Claims, 6 Drawing Figs.
[52] U.S. Cl. .................................................. 137/598,
    137/525, 137/599, 251/85, 251/139
[51] Int. Cl. ...................................................... F16d 65/24
[50] Field of Search............................................ 137/525,
    598, 599; 251/139, 85; 303/89; 192/3 H;
    188/152.15

[56] References Cited
UNITED STATES PATENTS
2,828,863  4/1958  Van Lier et al. ............... 137/525 X
3,153,426  10/1964 Milster ......................... 137/598
3,450,158  6/1969  Tilney et al. .................. 137/598

*Primary Examiner*—Robert G. Nilson
*Attorney*—McGlew and Toren

ABSTRACT: A valve construction includes a cylinder having an inlet fitting at one end and an outlet fitting at an opposite secondary end and being divided internally into an inlet chamber portion adjacent the inlet end and an outlet chamber portion adjacent the outlet end. A nozzle-shaped member is disposed in the outlet chamber and urged in a direction by a washer element toward the inlet end so that its nozzle points into the inlet chamber. The nozzle member defines an interior passage which may be closed by a poppet portion of a slide valve member which, in the nonactuated position is urged by a spring toward the inlet end into a position at which it opens the passage to the nozzle member. An electromagnetic coil is provided to cause movement of the valve member which is formed as a magnetically attractable armature so that it will move downwardly with the poppet member carried thereby in accordance with the primary pressure exerted through the inlet to overcome the biasing force of the spring and to at least partially close the passage of the nozzle member. A portion of the inlet flow is divided at the nozzle member and flows around the nozzle member into an annular passage defined therearound at the outlet chamber and which is sealed by a lip shaped tacking. During the primary pressure flow conditions, a portion of the liquid will pass around the packing and exit out through the outlet wherein an excessive pressure will cause an annular flange member to move upwardly to seal the connection between the outlet and inlet passages which is formed around the nozzle member.

PATENTED JUL 13 1971

3,592,228

INVENTORS
TETSUO NUKUMINATO
AKIRA OHASHI

BY McGlew and Toren
ATTORNEYS

MAGNET VALVE

DETAILED DESCRIPTION OF THE INVENTION

This invention relates to a magnet valve mounted between a master cylinder and a wheel cylinder of a car, and the object of the invention is to obtain such magnet valve which comprises a check valve adapted to perform a checking action against a two-way valve with packing and an escape valve arrange to perform an escaping action by providing a poppet in a movable element and which can perform the return flow throttling operation and allows the respective valves to accomplish not only their own individual functions but also the functions as a unitary assembly.

BRIEF DESCRIPTION OF THE DRAWING

The drawings illustrate an embodiment of the present invention, where.

Figure 1:
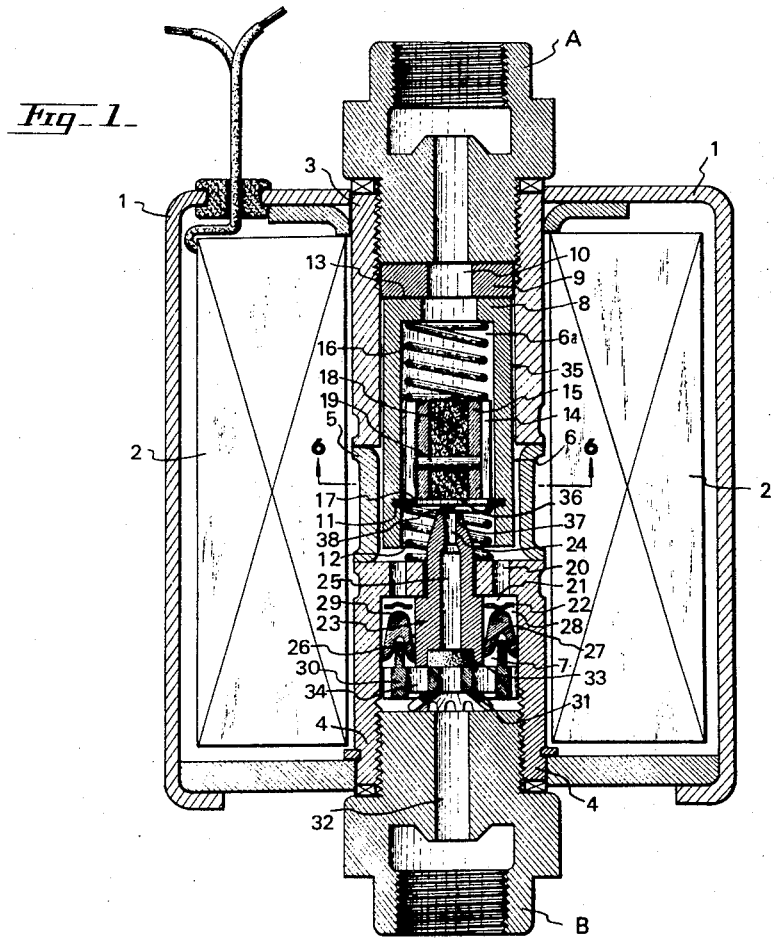
FIG. 1 is a longitudinal sectional front view of the magnet valve device according to the present invention.
Figures 2, 3, 4, 5, 6:
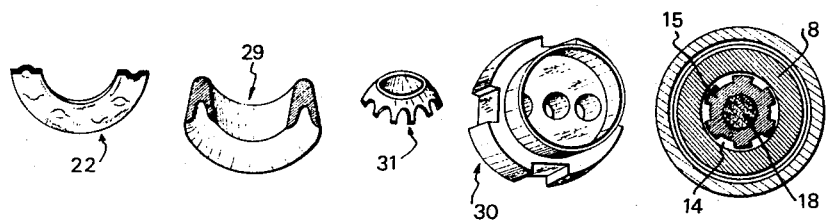
FIG. 2 is a sectional perspective view of a flange-shaped packing patch.
FIG. 3 is a sectional perspective view of a lip-shaped packing.
FIG. 4 is a perspective view of a shakeproof washer.
FIG. 5 is a perspective view of a packing patch having a tubular flange.
FIG. 6 is a sectional view as taken along the line A-A of FIG. 1.

In the following will be discussed an embodiment of the present invention with reference to the accompanying drawings.

Referring generally to the drawings, 1 denotes a case in which a magnet coil 2 is housed. A primary side cylinder 3 and a secondary side cylinder 4 are joined together by welding or other means, with a pipe 5 having flanges at both top and bottom ends being interposed therebetween, to form valve chambers 6 and 7 defining an inlet passage and an outlet passage, respectively. Said valve chamber 6 defining the inlet passage serves as a guide cylinder in which a movable element 8 operated with excitation of the magnet coil 2 is slided. In the primary side cylinder 3 is also mounted a doughnut-shaped disc 9 which doubles as a seat for the movable element. On top of this cylinder 3 is screw-engaged coupling (A) having a flow passage 10 and provided with an internal thread for piping connection. The movable element 8 is pressed against the other end face 13 of the disc 9 by a spring 12 through a retaining ring 11 fitted in an annular groove formed near the end wall of the movable element.

The inner cylindrical portion of the movable element 8 constitutes a poppet slide guiding cylinder forming an escape valve, and a poppet 15 provided with an axial communication passage around the outer periphery thereof is pressed against an end face 17 of the retaining ring by means of a spring 16 which affords an escaping force.

18 indicates an elastic rubber disc which offers a sealing action and is secured to the poppet 15 by a pin 19.

Represented by 7 is the valve chamber defining the outlet passage, in which a passage 20 communicating the valve chamber 6 with the valve chamber 7 is formed on an end face of the secondary side cylinder 4. There is also provided in said chamber 7 a flange-shaped packing patch 22 forming a passage 21. As will also be seen, a narrowed passage 24 and a passage 25 are formed in a nozzle 23 opposed to said poppet 15, said passages leading into the secondary side cylinder 4.

Further, an elastic lip-shaped packing 29 is disposed in an annular space 28 between a cylindrical portion 26 of the nozzle 23 forming the check valve and a cylindrical portion 27 of the valve chamber 7. The nozzle 23 and the lip-shaped packing 29 are compressed by a doubling plate 30 through a shakeproof washer 31. At the bottom of the cylinder 4 is screw engaged a coupling (B) provided with a thread for piping purpose and formed with a passage 32 which doubles as a seat for the shakeproof washer 31.

33 denotes an air-permeating resin disc serving as a filter and fitted into the nozzle 23.

Now, discussion will be directed to the operational aspect of the present invention having the above-described construction. When primary hydraulic pressure is applied under a state where no electric current is fed to the magnet coil 2, fluid passes through the passage 10, the cylindrical portion 6a of the valve chamber 6 and the communicating passage 14 into the flow passage 17 where said fluid is divided into two portions. One portion passes through the communicating passage 20 to become secondary hydraulic pressure and further passes to the flow passage 21. The lip-shaped packing 29, as applied with back pressure forms an annular passage space between the cylindrical portion of the nozzle 23 and the cylindrical portion 27 of the valve chamber, and said fluid passes this space and then a passage 34 into the outlet passage 32. While, the other portion of fluid ramified from the communicating passage 14 passes the narrow passage 24, passage 25 and filter 33 to become secondary hydraulic pressure which is then led into the outlet passage 32 to be joined with the first-said portion therein without the primary side flow being throttled.

Upon application of an electric current in the magnet coil 2, an electromagnetic force is produced, causing the movable element 8 to slide together with the poppet 15 along the guiding cylinder 35 against the force of the spring 12, resulting in closing the narrow passage 24 of the opposed nozzle 23 with the upper face 36 of the poppet 15. On the other hand, the annular space between the cylindrical portion 26 of the nozzle 23 and the cylindrical portion 27 of the valve chamber is subjected to secondary hydraulic pressure to apply force to the inner face of the lip-shaped packing 29, causing the tubular flange portion 22 to be forced out outwardly to positively close the annular flow passage space 28, so that primary hydraulic pressure is perfectly shut out, with only secondary hydraulic pressure being retained.

It should be noted here that even if primary hydraulic pressure is reduced, as long as the force applied to the pressure receiving face 36 of the poppet opposed to the nozzle 23 is not enough to exceed the force of the spring 16, the poppet 15 is retained in position and also the annular space 28 between the cylindrical portion 23 of the nozzle and the cylindrical portion 27 of the valve chamber remains closed by the action of the lip-shaped packing 29, so that retension of secondary hydraulic pressure is assured, allowing positive performance of function of the check valve.

In case the secondary hydraulic pressure should be increased by some reason or other and consequently a force exceeding that of the spring 16 should be produced on the pressure receiving face 36, the poppet 15 is automatically pushed against the set force of the spring 16 to form a space 38 between the end face 37 of the nozzle and the pressure receiving face 36 to escape such extra force toward the primary side, thereby adjusting the secondary hydraulic pressure always constant. Thus, the function of an escape valve is effected by actuation of the poppet 15 provided in the movable element 18.

When the electric current to the magnet coil 2 is shut off, the movable element 8 and the poppet 15 are immediately pressed together against the other end face 13, so that the secondary hydraulic pressure passes from the passage 32 only through the filter 33, the passage 25 and the narrow passage 24, thus throttling the return flow, with the flow being smoothly returned to the passage 10 through the primary side communicating passage 14.

According to the present invention having the above-described construction and function, the annular flow passage space 28 between the cylindrical portion 23 of the nozzle and the cylindrical portion 27 of the valve chamber is closed by the lip-shaped packing 29, thus assuring maintenance of the secondary hydraulic pressure, so that even if internal pressure in the primary pressure side (master cylinder) is lost, internal pressure in the secondary pressure side (wheel cylinder) remains in its entirety. Therefore, in case a car is stopped halfway on an upward slope, even if the driver's foot is detached from the brake pedal, the car won't move back since pressure remains in the secondary side. (For release of such pressure in the secondary side, means are provided for effecting such release automatically by electric action of clutch or other means.)

In case of sudden application of the brake, more than required amount of pressure, say from 120 kg./cm.$^2$ to 130 kg./cm.$^2$, is given to both primary and secondary sides, and such excess pressure would cause early wear of the packing and other related members. Therefore, according to the present invention, whenever the force applied to the pressure receiving face 36 exceeds the force of the spring 16, the poppet 15 is automatically forced out against the set force of the spring 16, forming a space between the cylindrical portion 37 and the pressure receiving face 36 to allow fluid to escape to the primary side, thereby to control the secondary pressure.

Further, in order to eliminate impact of the car which may be caused by sudden reduction of internal pressure in the secondary pressure side, arrangement is made such that when the electric current to the magnet coil is shut off, the movable element 8 and the poppet 15 are immediately pressed en bloc against the end face 13 by the spring force, allowing secondary pressure to pass from the passage 32 through the filter 33 and the passage 25 so as to be returned gradually little by little from the narrow passage 24, thereby to gently reduce the secondary side pressure.

We claim:

1. A check valve construction comprising cylinder means defining a primary side inlet chamber and a secondary side outlet chamber, an inlet fitting defining an inlet passage connected to said primary side inlet chamber, an outlet fitting defining a secondary outlet passage and being connected to said secondary side outlet chamber, a sleeve member movable in said inlet chamber and having an inlet opening at its one end for communicating with said inlet fitting inlet passage and a poppet portion movable therewith and defining a flow passage therethrough, a nozzle member defining a passage therethrough extending between said inlet chamber and said outlet chamber and being arranged in said outlet chamber in spaced location from the interior walls thereof to define an annular passage there around, an annular packing disposed in said annular passage and having portions engageable with respective wall of said nozzle member interior of said outlet chamber but being releaseable therefrom in a direction of said outlet upon build up of pressure, said annular passage communicating downstream of said packing with said outlet passage, spring means in said inlet chamber urging said sleeve member with said poppet portion in a direction away from said nozzle to fully open the passage through said nozzle, and means for moving said sleeve member against the force of said spring means to close the nozzle passage.

2. A valve, according to claim 1, wherein said means for moving said sleeve member comprises an electromagnetic exciting coil, said sleeve member being of a material attractible by excitation of said coil and movable thereby.

3. A valve, according to claim 1, including a retaining ring carried by said sleeve member and forming an abutment for said poppet portion, a spring biasing said poppet portion into engagement with said retaining ring.

4. A valve, according to claim 3, wherein said spring means acts against said ring.

5. A valve, according to claim 1, including a flange shaped packing member of annular construction overlying said annular packing, said annular packing being of lip-shaped formation, a doubling plate extending across the interior of said cylinder means and separating said inlet chamber from said outlet chamber, said plate having a central passage for the passage of said nozzle member therethrough and at least one additional passage around said nozzle member leading into said annular chamber having said annular packing.

6. A valve, according to claim 5, wherein said nozzle member includes a small diameter passage portion at the end of said nozzle which projects into said inlet passage and which widens outwardly toward said outlet passage.

7. A valve, according to claim 2, including a permeable disc disposed at the outlet end of said passage of said nozzle member, a doubling plate disposed between said nozzle member and said outlet fitting and including an annular wall portion forming a seat for said annular packing and having a plurality of openings therethrough including a central opening communicating with the passage of said nozzle and an outer opening communicating with the annular passage containing said annular packing.